United States Patent
Rupley et al.

(10) Patent No.: US 8,825,988 B2
(45) Date of Patent: Sep. 2, 2014

(54) MATRIX ALGORITHM FOR SCHEDULING OPERATIONS

(75) Inventors: Jeff Rupley, Round Rock, TX (US); Rajagopalan Desikan, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 964 days.

(21) Appl. No.: 12/945,432

(22) Filed: Nov. 12, 2010

(65) Prior Publication Data

US 2012/0124589 A1    May 17, 2012

(51) Int. Cl.
*G06F 9/46* (2006.01)
*G06F 9/48* (2006.01)
*G06F 9/38* (2006.01)

(52) U.S. Cl.
CPC .......... *G06F 9/46* (2013.01); *G06F 9/4843* (2013.01); *G06F 9/3851* (2013.01); *G06F 9/3853* (2013.01); *G06F 9/3838* (2013.01)
USPC ........................................................ 712/214

(58) Field of Classification Search
CPC . G06F 9/30123; G06F 9/3851; G06F 9/3838; G06F 9/4843; G06F 7/5338; G06F 9/3853; G06F 9/46
See application file for complete search history.

(56) References Cited

U.S. PATENT DOCUMENTS

| 5,710,902 A * | 1/1998 | Sheaffer et al. ............... 712/216 |
| 6,460,130 B1 * | 10/2002 | Trull et al. ...................... 712/32 |
| 8,245,105 B2 * | 8/2012 | Dell et al. ...................... 714/758 |
| 2007/0113223 A1 * | 5/2007 | Ludwig et al. ................ 717/161 |
| 2007/0150657 A1 * | 6/2007 | Yigzaw et al. ................ 711/128 |

OTHER PUBLICATIONS

Goshima et al., "A High-Speed Dynamic Instruction Scheduling Scheme for Superscalar Processors"*MICRO 34* Proceedings of the 34th annual ACM/IEEE international symposium on Microarchitecture IEEE Computer Society Washington, DC, USA © 2001 http://portal.acm.org/citation.cfm?doid=563998.564028.

* cited by examiner

*Primary Examiner* — Eric Coleman (57) ABSTRACT

The present invention provides a method and apparatus for implementing a matrix algorithm for scheduling instructions. One embodiment of the method includes selecting a first subset of instructions so that each instruction in the first subset is the earliest in program order of instructions associated with a corresponding one of a plurality of sub-matrices of a matrix that has a plurality of matrix entries. Each matrix entry indicates the program order of one pair of instructions that are eligible for execution. This embodiment also includes selecting, from the first subset of instructions, the instruction that is earliest in program order based on matrix entries associated with the first subset of instructions.

26 Claims, 6 Drawing Sheets

MATRIX ALGORITHM FOR SCHEDULING OPERATIONS

BACKGROUND OF THE INVENTION

1. Field of the Invention

This invention relates generally to processor-based systems, and, more particularly, to a matrix algorithm for scheduling operations in processor-based systems.

2. Description of the Related Art

Conventional processor-based systems typically include one or more processing elements such as a central processing unit (CPU), a graphical processing unit (GPU), an accelerated processing unit (APU), and the like. The processing units include one or more processor cores that are configured to access instructions and/or data that are stored in a main memory and then execute the instructions and/or manipulate the data. Each processor core includes a floating point unit that is used to perform mathematical operations on floating point numbers when required by the executed instructions. For example, conventional floating-point units are typically designed to carry out operations such as addition, subtraction, multiplication, division, and square root. Some systems can also perform various transcendental functions such as exponential or trigonometric calculations. Floating-point operations may be handled separately from integer operations on integer numbers. The floating-point unit may also have a set of dedicated floating-point registers for storing floating-point numbers.

High-performance out-of-order execution microprocessors can select operations for execution out of program order. Out-of-order processing can be used to improve the performance of a processor-based system as long as the dependencies between the operations are respected and accounted for by the microprocessor. For example, a floating-point unit may be able to perform floating-point operations in an order that is different than the order that is specified in the program code. However, before the floating-point unit can execute an operation, the floating-point unit must determine whether all the operands of the operation are ready, whether any other operations are blocking the current operation, whether any pipeline hazards exist, and whether any other conditions would cause the operation to complete incorrectly. The floating-point unit must also schedule the operation. Conventional instruction scheduling approaches can slow down logical elements in the processor system, such as the floating-point unit, leading to timing issues that degrade the performance of the system.

SUMMARY OF EMBODIMENTS OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for implementing a matrix algorithm for scheduling instructions. One embodiment of the method includes selecting a first subset of instructions so that each instruction in the first subset is the earliest in program order of instructions associated with one of a plurality of sub-matrices of a matrix. Each matrix entry indicates the program order of one pair of instructions that are eligible for execution. This embodiment also includes selecting, from the first subset of instructions, the instruction that is earliest in program order based on matrix entries associated with the first subset of instructions.

In another embodiment, an apparatus is provided for implementing a matrix algorithm for scheduling instructions. One embodiment of the apparatus includes pick logic configured to select a first subset of instructions so that each instruction in the first subset is the earliest in program order of instructions associated with one of a plurality of sub-matrices of a matrix. Each matrix entry indicates the program order of one pair of instructions that are eligible for execution. The pick logic is also configured to select, from the first subset of instructions, the instruction that is earliest in program order based on matrix entries associated with the first subset of instructions.

In yet another embodiment, a computer readable media is provided that includes instructions that when executed can configure a manufacturing process used to manufacture a semiconductor device including pick logic configured to select a first subset of instructions so that each instruction in the first subset is the earliest in program order of instructions associated with one of a plurality of sub-matrices of a matrix. Each matrix entry indicates the program order of one pair of instructions that are eligible for execution. The pick logic is also configured to select, from the first subset of instructions, the instruction that is earliest in program order based on matrix entries associated with the first subset of instructions.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes embodiments of a matrix scheduling technique that can be used to speed instruction scheduling in logical elements of a processor-based system, such as the floating point unit. Previous scheduling techniques include randomly (or pseudo-randomly) picking an instruction from among the instructions that are ready to be performed, picking the oldest instruction when it is ready, and/or multiplexing between the two algorithms. In contrast, embodiments of the matrix scheduling technique described herein select a first subset of instructions so that each instruction in the first subset is the earliest in program order of instructions associated with a sub-matrix of a matrix that indicates the program orders of pairs of instructions that are eligible for execution. Embodiments of the matrix scheduler may then select the instruction in the first subset that is earliest in program order based on matrix entries associated with the first subset of instructions Embodiments of the matrix scheduling technique described herein may significantly improve performance of the system relative to the convention approaches. For example, embodiments of a floating point unit that implements matrix scheduling may run 20% faster than a floating point unit that runs the pseudo-random pick algorithm in parallel with the oldest instruction algorithm and then multiplexes between the two algorithms. Another advantage is that embodiments of the matrix algorithm can be configured to pick the oldest ready instruction, which may not be the oldest overall instruction in the instruction queue, instead of picking either the oldest overall instruction or a pseudo-random instruction when then oldest overall instruction is not ready, e.g., because one or more operands are not ready or due to blocking or hazards. Oldest-ready scheduling according to embodiments of the techniques described herein can in some cases speed up timing enough allow elements such as the floating point unit to switch from a 2-cycle ready/pick loop to a 1-cycle ready/pick loop. For example, floating point units that implement matrix scheduling as described herein can support 1-cycle operations for most vector integer operations and some floating point operations.

Figure 1:
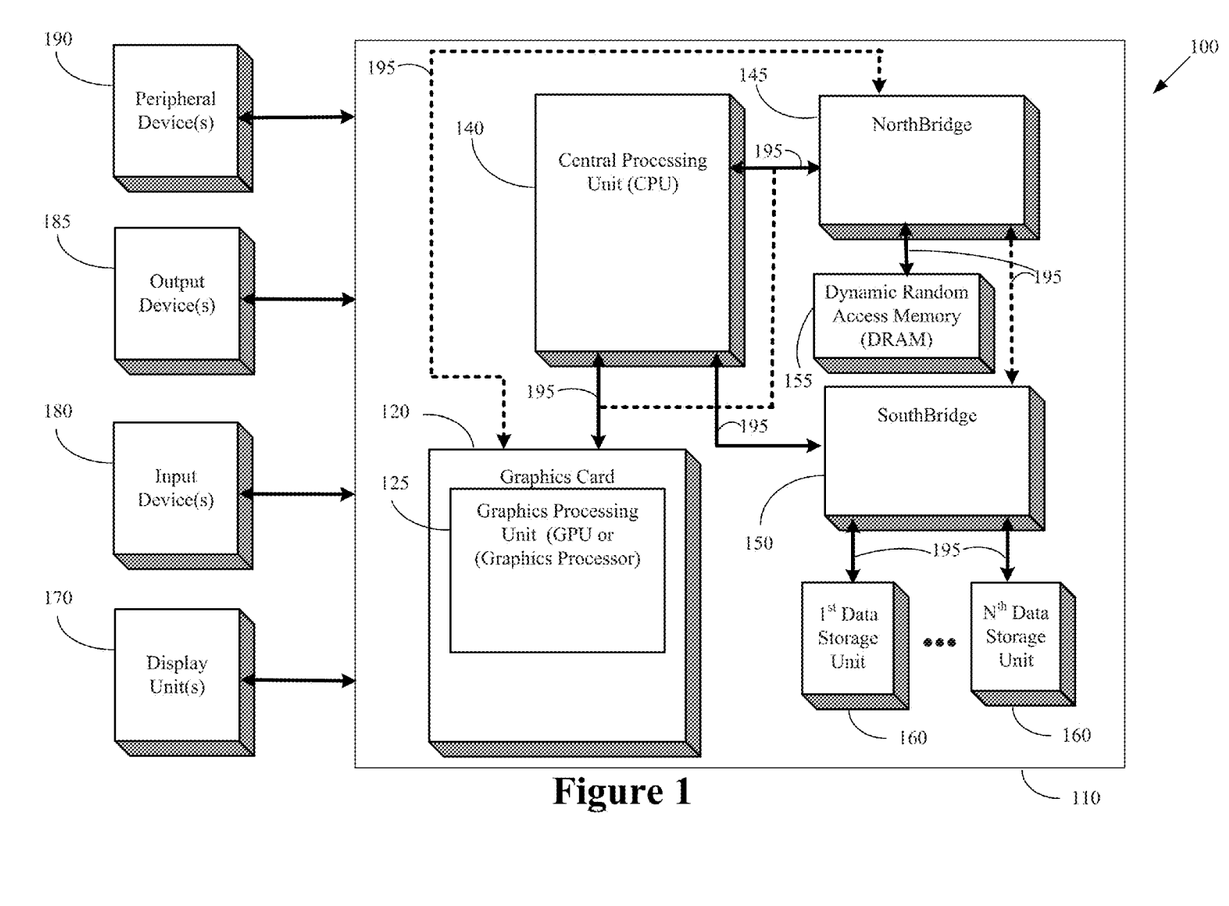
FIG. 1 conceptually illustrates one exemplary embodiment of a computer system.

FIG. 1 conceptually illustrates one exemplary embodiment of a computer system 100. In various embodiments, the computer system 100 may be a personal computer, a laptop computer, a handheld computer, a netbook computer, a mobile device, a telephone, a personal data assistant (PDA), a server, a mainframe, a work terminal, or the like. The computer system includes a main structure 110 that may be a computer motherboard, system-on-a-chip, circuit board or printed circuit board, a desktop computer enclosure and/or tower, a laptop computer base, a server enclosure, part of a mobile device, personal data assistant (PDA), or the like. In one embodiment, the computer system 100 runs an operating system such as Linux, Unix, Windows, Mac OS, or the like.

In the illustrated embodiment, the main structure 110 includes a graphics card 120. For example, the graphics card 120 may be an ATI Radeon™ graphics card from Advanced Micro Devices, Inc. ("AMD"). The graphics card 120 may, in different embodiments, be connected on a Peripheral Component Interconnect (PCI) Bus (not shown), PCI-Express Bus (not shown), an Accelerated Graphics Port (AGP) Bus (also not shown), or other electronic and/or communicative connection. In one embodiment, the graphics card 120 may contain a graphics processing unit (GPU) 125 used in processing graphics data. In various embodiments the graphics card 120 may be referred to as a circuit board or a printed circuit board or a daughter card or the like.

The computer system 100 shown in FIG. 1 also includes a central processing unit (CPU) 140, which is electronically and/or communicatively coupled to a northbridge 145. The CPU 140 and northbridge 145 may be housed on the motherboard (not shown) or some other structure of the computer system 100. It is contemplated that in certain embodiments, the graphics card 120 may be coupled to the CPU 140 via the northbridge 145 or some other electronic and/or communicative connection. For example, CPU 140, northbridge 145, GPU 125 may be included in a single package or as part of a single die or "chips". In certain embodiments, the northbridge 145 may be coupled to a system RAM (or DRAM) 155 and in other embodiments the system RAM 155 may be coupled directly to the CPU 140. The system RAM 155 may be of any RAM type known in the art; the type of RAM 155 does not limit the embodiments of the present invention. In one embodiment, the northbridge 145 may be connected to a southbridge 150. In other embodiments, the northbridge 145 and southbridge 150 may be on the same chip in the computer system 100, or the northbridge 145 and southbridge 150 may be on different chips. In various embodiments, the southbridge 150 may be connected to one or more data storage units 160. The data storage units 160 may be hard drives, solid state drives, magnetic tape, or any other writable media used for storing data. In various embodiments, the central processing unit 140, northbridge 145, southbridge 150, graphics processing unit 125, and/or DRAM 155 may be a computer chip or a silicon-based computer chip, or may be part of a computer chip or a silicon-based computer chip. In one or more embodiments, the various components of the computer system 100 may be operatively, electrically and/or physically connected or linked with a bus 195 or more than one bus 195.

The computer system 100 may be connected to one or more display units 170, input devices 180, output devices 185, and/or peripheral devices 190. In various alternative embodiments, these elements may be internal or external to the computer system 100, and may be wired or wirelessly connected. The display units 170 may be internal or external monitors, television screens, handheld device displays, and the like. The input devices 180 may be any one of a keyboard, mouse, track-ball, stylus, mouse pad, mouse button, joystick, scanner or the like. The output devices 185 may be any one of a monitor, printer, plotter, copier, or other output device. The peripheral devices 190 may be any other device that can be coupled to a computer. Exemplary peripheral devices 190 may include a CD/DVD drive capable of reading and/or writing to physical digital media, a USB device, Zip Drive, external floppy drive, external hard drive, phone and/or broadband modem, router/gateway, access point and/or the like.

Figure 2:
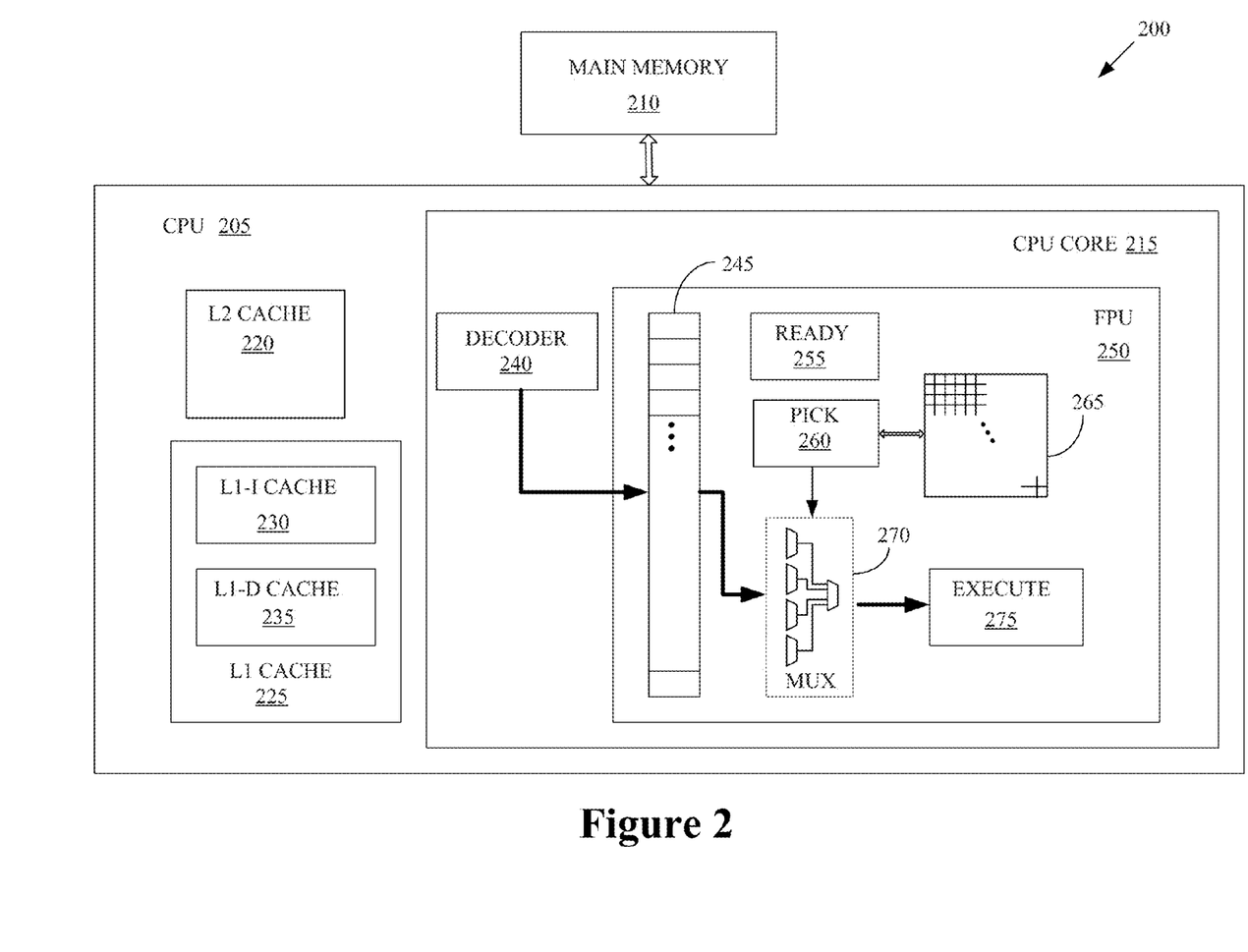
FIG. 2 conceptually illustrates a first exemplary embodiment of a semiconductor device that may be implemented in embodiments of the computer system shown in FIG. 1.

FIG. 2 conceptually illustrates a first exemplary embodiment of a semiconductor device 200 that may be formed in or on a semiconductor wafer (or die). The semiconductor device 200 may be formed in or on the semiconductor wafer using well known processes such as deposition, growth, photolithography, etching, planarising, polishing, annealing, and the like. In one embodiment, the semiconductor device 200 may be implemented in embodiments of the computer system 100 shown in FIG. 1. In the illustrated embodiment, the device 200 includes a central processing unit (CPU) 205 (such as the CPU 140 shown in FIG. 1) that is configured to access instructions and/or data that are stored in main memory 210. However, as will be appreciated by those of ordinary skill in the art, the CPU 205 is intended to be illustrative and alternative embodiments may include other types of processor such as the graphics processing unit (GPU) 125 depicted in FIG. 1, a digital signal processor (DSP), an accelerated processing unit (APU), a co-processor, an applications processor, and the like. In the illustrated embodiment, the CPU 205 includes at least one CPU core 215 that is used to execute the instructions and/or manipulate the data. Alternatively, the processor-based system 200 may include multiple CPU cores 215 that work in concert with each other. The CPU 205 also implements a hierarchical (or multilevel) cache system that is used to speed access to the instructions and/or data by storing selected instructions and/or data in the caches. However, persons of ordinary skill in the art having benefit of the present disclosure should appreciate that alternative embodiments of the device 200 may implement different configurations of the CPU 205, such as configurations that use external caches.

The illustrated cache system includes a level 2 (L2) cache 220 for storing copies of instructions and/or data that are stored in the main memory 210. In the illustrated embodiment, the L2 cache 220 is 16-way associative to the main memory 210 so that each line in the main memory 210 can potentially be copied to and from 16 particular lines (which are conventionally referred to as "ways") in the L2 cache 220. However, persons of ordinary skill in the art having benefit of the present disclosure should appreciate that alternative embodiments of the main memory 210 and/or the L2 cache 220 can be implemented using any associativity. Relative to the main memory 210, the L2 cache 220 may be implemented using smaller and faster memory elements. The L2 cache 220 may also be deployed logically and/or physically closer to the CPU core 215 (relative to the main memory 210) so that information may be exchanged between the CPU core 215 and the L2 cache 220 more rapidly and/or with less latency.

The illustrated cache system also includes an L1 cache 225 for storing copies of instructions and/or data that are stored in the main memory 210 and/or the L2 cache 220. Relative to the L2 cache 220, the L1 cache 225 may be implemented using smaller and faster memory elements so that information stored in the lines of the L1 cache 225 can be retrieved quickly by the CPU 105. The L1 cache 225 may also be deployed logically and/or physically closer to the CPU core 215 (relative to the main memory 210 and the L2 cache 220) so that information may be exchanged between the CPU core 215 and the L1 cache 225 more rapidly and/or with less latency (relative to communication with the main memory 210 and the L2 cache 220). Persons of ordinary skill in the art having benefit of the present disclosure should appreciate that the L1 cache 225 and the L2 cache 220 represent one exemplary embodiment of a multi-level hierarchical cache memory system. Alternative embodiments may use different multilevel caches including elements such as L0 caches, L1 caches, L2 caches, L3 caches, and the like.

In the illustrated embodiment, the L1 cache 225 is separated into level 1 (L1) caches for storing instructions and data, which are referred to as the L1-I cache 230 and the L1-D cache 235. Separating or partitioning the L1 cache 225 into an L1-I cache 230 for storing only instructions and an L1-D cache 235 for storing only data may allow these caches to be deployed closer to the entities that are likely to request instructions and/or data, respectively. Consequently, this arrangement may reduce contention, wire delays, and generally decrease latency associated with instructions and data. In one embodiment, a replacement policy dictates that the lines in the L1-I cache 230 are replaced with instructions from the L2 cache 220 and the lines in the L1-D cache 235 are replaced with data from the L2 cache 220. However, persons of ordinary skill in the art should appreciate that alternative embodiments of the L1 cache 225 may not be partitioned into separate instruction-only and data-only caches 230, 235. The caches 220, 225, 230, 235 can be flushed by writing back modified (or "dirty") cache lines to the main memory 210 and invalidating other lines in the caches 220, 225, 230, 235. Cache flushing may be required for some instructions performed by the CPU 205, such as a RESET or a write-back-invalidate (WBINVD) instruction.

Processor-based systems can perform various types of instructions including memory access instructions such as stores that put (or store) information in a memory location such as a register, loads that read information out of a memory location, integer operations, floating point operations, and the like. The CPU core 215 can execute programs that are formed using combinations of these (and other) types of instructions. In the illustrated embodiment, programs are stored in the main memory 210 and the instructions are kept in program order, which indicates the logical order for execution of the instructions so that the program operates correctly. However, embodiments of the CPU 205 can be configured to perform instructions in an order that differs from the program order. Out-of-order instruction processing can speed up operation of the CPU 205 even after allowing for any additional overhead and/or cost of accounting for instruction dependencies, blocking, hazards, and the like.

The illustrated embodiment of the CPU core 215 includes a decoder 240 that selects and decodes program instructions so that they can be executed by the CPU core 215. The decoder 240 can dispatch, send, or provide the decoded instructions to other logical elements within the CPU core 215. For example, the decoder 240 can dispatch decoded floating-point instructions to a buffer 245 in a floating-point unit 250. In the illustrated embodiment, the CPU core 215 is an out-of-order processor that can execute instructions in an order that differs from the program order of the instructions in the associated program, e.g., the program as stored in main memory 210. For example, the decoder 240 may select and/or decode instructions and provide them to the buffer 245, where the instructions may wait until ready logic 255 in the floating-point unit 250 determines that the instructions are ready (or eligible) to be executed. Exemplary conditions that may need to be satisfied before an instruction is ready or eligible to be executed may include, but are not limited to, having all of the source operands for the instruction available and up-to-date (e.g., none of the instructions that generate the source operands are in flight), making sure that other operations are not blocking the current operation, ensuring that no pipeline hazards exist, and the like.

The floating-point units 250 may then schedule instructions that are ready or eligible to be executed. In the illustrated embodiment, scheduling is performed by pick logic 260 that is electronically and/or communicatively coupled to a matrix 265 and a multiplexing function 270. For example, each instruction that is eligible for execution can be associated with a row and a column of the matrix 265. Each matrix entry can therefore be identified by row and column and each matrix entry may indicate the relative program order of the pair of instructions that correspond to the row and column. In one embodiment, the pick logic 260 may select a first subset of instructions from mutually exclusive sub-matrices of the matrix 265. The pick logic 260 can be configured so that each of the selected instructions in the first subset is the earliest in program order of the instructions that are associated with each sub-matrix. The pick logic 260 can also select the instruction that is earliest in program order of the first subset of instructions. Signals generated by the pick logic 260 can be used as input signals to the multiplexing function 270, which use the input signals to select the earliest (i.e., oldest) eligible instruction to be provided to the execute logic 275 for execution.

Figure 3:
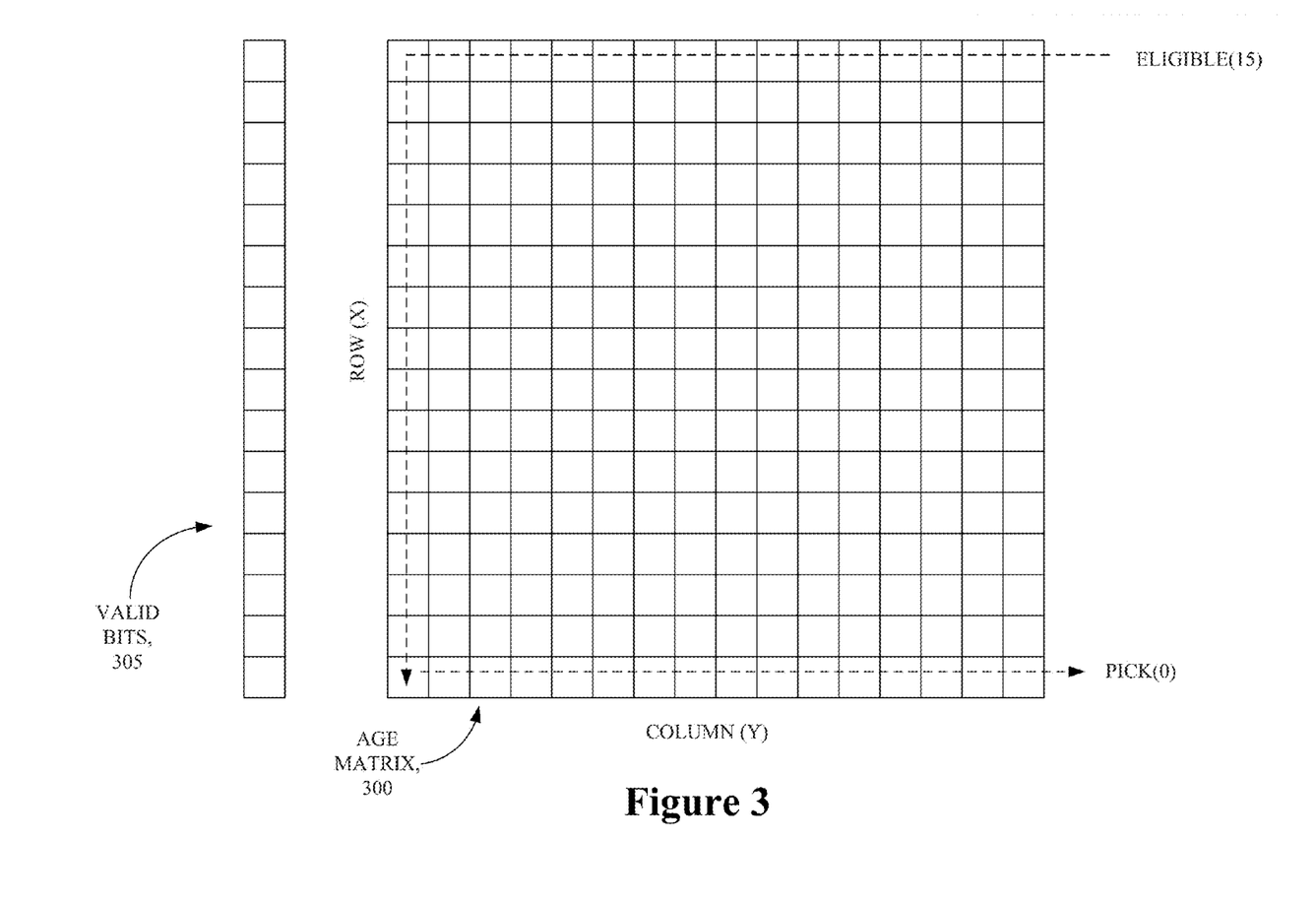
FIG. 3 conceptually illustrates a first exemplary embodiment of a matrix that can be used to indicate the program order of instructions.

FIG. 3 conceptually illustrates a first exemplary embodiment of a matrix 300 that can be used to indicate the program order of instructions. The matrix 300 also indicates the relative age of the instructions (e.g., instructions that are earlier in program order are older and instructions that are later in program order are younger) and so the matrix 300 may be referred to as an age matrix. In the illustrated embodiment, each instruction is associated with a row (X) and a column (Y). For example, a first instruction can be associated with the row 1 and the column 1 and a second instruction can be associated with the row 3 and the column 3. New instructions can be added to the matrix 300 when they are ready or eligible for execution and the new instructions may be added to any row/column of the matrix 300. The matrix indices therefore do not generally indicate any particular ordering of the instructions and any instruction can use any matrix index that is not already being used by different instruction. The matrix 300 shown in FIG. 3 is a 16×16 matrix that can support a 16 entry scheduler/buffer. The matrix 300 may therefore be implemented using 16^2 flops (256 flops). However, persons of ordinary skill in the art having benefit of the present disclosure should appreciate that the size of the matrix 300 is intended to be exemplary and alternative embodiments of the matrix 300 may include more or fewer entries.

Each bit position (X,Y) in the matrix 300 may indicates the age (or program order) relationship of instruction X to instruction Y. For example, a bit value of '1' in the entry (X,Y) may indicate instruction X is younger and later in the program order than instruction Y. A bit value of '0' in the entry (X,Y) may indicate that instruction X is older and earlier in the program order than instruction Y. In the illustrated embodiment, only the rows/columns corresponding to instructions that are ready or eligible for execution include valid information. The valid rows/columns can therefore be indicated using a set of valid bits 305. Since the indices of valid rows/columns are the same, i.e., if the row 1 includes valid information then the column 1 may also include valid information, the valid bits 305 for the matrix 300 may be stored in a vector.

Entries in the matrix 300 may have a number of properties that can facilitate efficient use of the matrix 300 for selecting eligible instructions for execution. For example, for any (X, Y) position in the matrix there is also a (Y, X) position that may be used to compare the relative ages (and/or positions in program order) for the same pair of instructions X and Y in the reverse order. In the general case of X !=Y, either X is older than Y or Y is older than X. Consequently, only one of the entries (X, Y) or (Y, X) in the matrix 300 is set to a value indicating a younger entry, e.g., a bit value of 1. This property may be referred to as "1-hot." For another example, a particular instruction has no age relationship with itself and so when X=Y (i.e., along the diagonal of the matrix 300) the diagonal entries of the matrix 300 can be set to an arbitrary value, e.g., these entries can be set to '0' or not set. For yet another example, the row corresponding to the oldest valid instruction/operation is a vector of 0 values because the oldest valid instruction is older (e.g., earlier in the program order) than any of the other valid instruction/operations associated with the matrix 300. Similarly, the second oldest valid operation/instruction has one bit in its row set to a value of 1 since this instruction is older than all of the other valid instruction/operations except for the oldest valid instruction. This pattern continues with additional valid instructions so that the third oldest valid instruction/operation has 2 bits in its row set, the fourth oldest valid instruction/operation has three bits set in its row, and so on until (in the case of a full matrix 300 that has 16 valid entries) the youngest instruction/operation has 15 of its 16 bits set. In this example, the $16^{th}$ bit is not set because this is the bit that is on the diagonal of the matrix 300 and is therefore not set.

Figure 4:
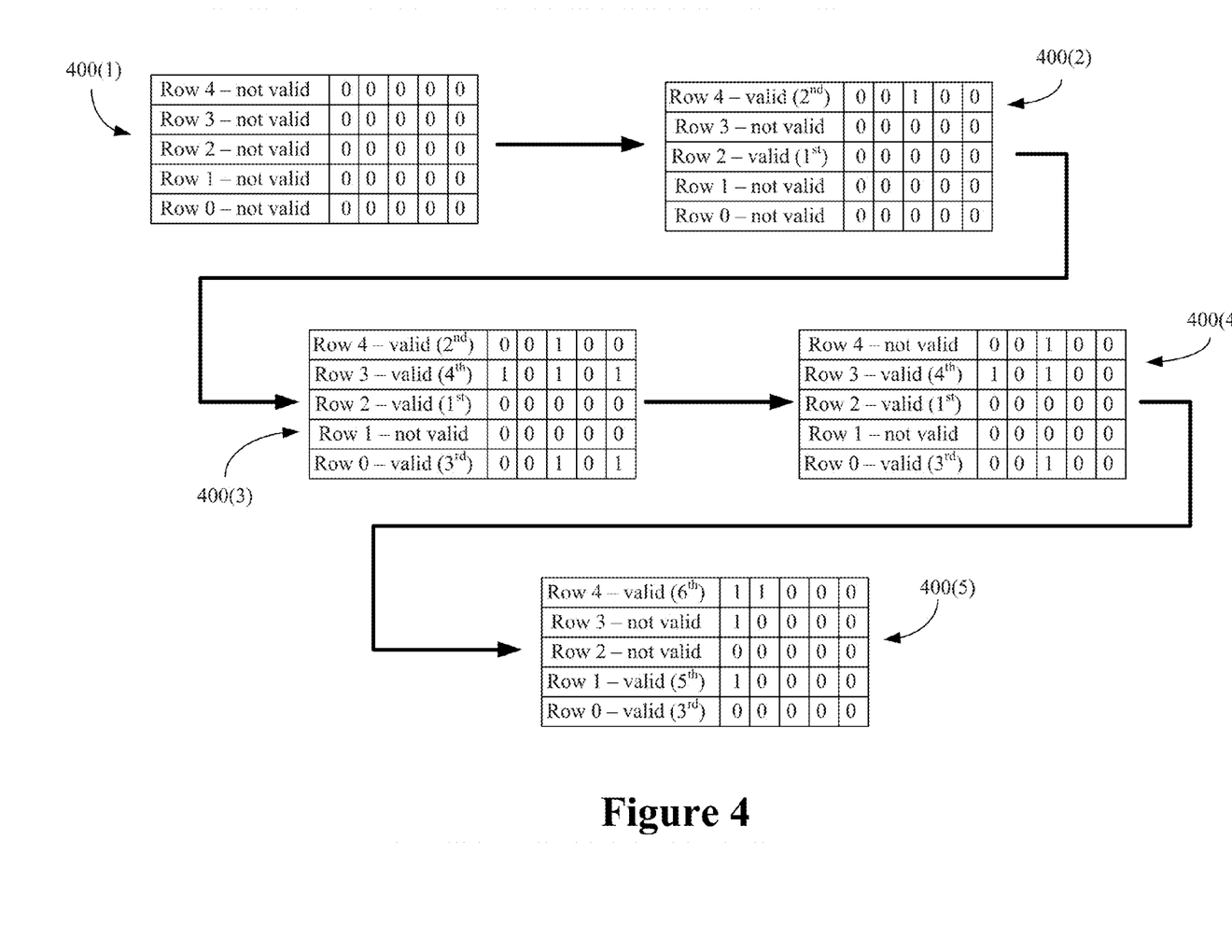
FIG. 4 conceptually illustrates a second exemplary embodiment of a matrix that may be formed and modified by the addition and removal of instructions.

FIG. 4 conceptually illustrates a second exemplary embodiment of a matrix 400 as it is formed and modified by the addition and removal of instructions. In the illustrated embodiment, the matrix 400 is a 5×5 matrix that can be used to indicate the age relationships between up to five instructions that are eligible for execution. However, persons of ordinary skill in the art having benefit of the present disclosure should appreciate that the illustrated size of the matrix 400 is exemplary and alternative embodiments of the matrix 400 may include more or fewer entries.

In the illustrated embodiment, the matrix 400 is updated by row when entries are allocated. For example, up to 2 entries (each corresponding to instruction that is eligible for execution) could be added per cycle. In the illustrated embodiment, instructions/operations are allocated into the scheduler in program order and so instructions/operations that become valid in the current cycle are older than instruction/operations that have already been associated with entries in the matrix 400. When 2 instructions/operations arrive in the same cycle, the first of instruction is older than the second instruction and so the second instruction accounts for the presence of the older first instruction when setting the values of the bits in its assigned/allocated row.

In the illustrated embodiment, the columns of the matrix 400 are cleared when entries are picked and issued. For example, if the system uses two instruction pipelines, up to 2 entries can be picked for execution per cycle, e.g., one entry can be placed on the first pipeline and another entry can be placed on the second pipeline. Clearing columns associated with the issued instructions clears the dependencies for any newer instructions (relative to the issued instructions) and allows the entries that have been previously allocated to the issued instructions to be de-allocated so that a later incoming instruction can re-use that row/column without creating an alias.

During the first cycle 400(1), the matrix 400 is cleared by setting all of the bits to 0 and providing an indication that none of the rows are valid. Two operations arrive during the second cycle 400(2) and these operations are allocated rows 2 and 4. The first operation (the youngest operation) is allocated to row 2 and the second operation (the older of the two) is allocated to row 4. The values of the bits in row 2 are therefore set to 0 and the values of the bits in row 4 are set to zero, except for the value of the position 2, which is set to 1 to indicate that the second operation is older than the first operation. The rows 2 and 4 include valid information. During the third cycle 400(3), third and fourth instructions arrive and are assigned to row 0 and row 3, respectively. The third instruction therefore inserts a valid vector of (00101) into row 0 and the fourth construction insert a valid vector of (10101) into row 3.

The second oldest instruction schedules during the fourth cycle 400(4). Column 4 may therefore be cleared, e.g., a vector of bit values of (00000) can be written to the entries of column 4. Once column 4 has been cleared, the updated/modified row 0 has only 1 age dependency set with a bit value of 1, which means the instruction allocated to row 0 is now the $2^{nd}$ oldest op. There is still only 1 valid row with all bits cleared (row 2), 1 valid row with only 1 bit set (row 0), and 1 valid row with only 2 bits set (row 3). Row 4 still has one bit in its row set, but since row 4 is not valid the presence of this bit value does not affect the operation of the matrix 400 or the associated scheduler.

During the fifth cycle 400(5), fifth and six instructions arrive concurrently with the first and fourth instructions issuing. The fifth arriving instruction is inserted in row 1 and the second instruction is inserted in row 4. Entry 2 (which is allocated to the current oldest instruction) and entry 3 both schedule and they perform column clears. In the illustrated embodiment, the column clears take priority over the new row insertions. Therefore the fifth instruction may insert a valid vector of (10110) into row 1 but column clears on columns 2 and 3 take priority for those bits, leading to an effective update of row 1 to bit values of (10000). At this point, the new oldest op is the third instruction sent, which is in entry 0 and has all bits set to 0. The fifth instruction is the second oldest and so row 1 has 1 valid bit set. The sixth instruction is the third oldest and so row 4 has 2 valid bits set. In the illustrated embodiment, row 3 has a bit of debris left over because the entry (3, 0) is still set. This does not affect operation of the matrix 400 or the scheduler because the entry is invalid and any later reuse of this row by a new instruction can set (or clear) the bits correctly.

Referring back to FIG. 3, the matrix 300 can be used to pick the oldest ready instruction. In the illustrated embodiment, an eligibility vector (Eligibility(X)) is used to indicate whether each row includes an instruction that is eligible and ready to be executed. For example, a value of "1" in an entry of the eligibility vector may indicate that the corresponding row is eligible and a value of "0" in an entry of the eligibility vector may indicate that the corresponding row is not eligible for execution. Combining the information in the eligibility vector with the information in the matrix 300 can be used to produce a "1-hot" vector, i.e., a vector that has at most one entry that is set to indicate that this entry is the oldest ready instruction. For example, the vector may have at most one entry that is set to a value of 1.

Entries in a matrix (Blocker) can be defined using the eligibility vector and the matrix 300 (indicated as Age (x, y)::

Blocker(y,x)=Eligible(X)&Age(Y,X)

Blocker(x,y)=Eligible(Y)&Age(X,Y)

This matrix satisfies the relationship Blocker(x,y) !=Blocker (y,x). A vector Blocker(x) can also be defined for a particular Row X and all potential Y columns corresponding to other instructions. To determine whether the instruction associated with row X should be picked, the Blocker(x) vector can be used to compute Pick(x) for a N×N matrix as follows:

Pick(x)=Eligible(X)&(~Blocker(x,0)&~ Blocker(x,1)& ... ~Blocker(x,N)).

Note that the identity position of Age(X,X) is 0 for the illustrated embodiment so an entry does not block itself. This property can be used to simplify the computation of Pick(x) by inserting the Eligibility check into the position occupied by Blocker(x, x):

Pick(x)=~Blocker(x,0)&~Blocker(x,1) ... &~ Blocker(x,x-1)&Eligible(x)&~ Blocker(x,x+1) ... ~Blocker(x,N).

Considering every row of the matrix 300, the Blocker(x,y) matrix can be used to independently compute the value of the Pick(x) vector for each row. Values of the Pick(x) vector can be used to select the oldest ready instruction and to provide feedback for updating the matrix 300 when instructions are picked and sent onto the pipeline for execution.

In one embodiment, the load on the Eligibility vector is such that each wire has some resistance-capacitance (RC) to be distributed throughout the matrix 300 on the appropriate rows and columns. Moreover, the wires used to convey the eligibility vector information may see N nand gates worth of gate cap (where N=16 for the illustrated embodiment of the matrix 300). In the illustrated embodiment, a worst case path (indicated by the dashed lines in FIG. 3) may occur when the Eligibility (15) wire comes in aligned with Row 15, runs the width of the matrix 300 until it hits column 15. At the column 15 point, the worst case path runs the height of the matrix from row 15 down to row 0. At each new row the column line crosses, the worst case path also sees an input leg to the local nand2 gate that is used to compute values of Blocker(row,15) except, in the illustrated embodiment, at the identity point (15,15) where the worst case path sees the input to the next level of gate in the pick tree. So, for the exemplary worst case, Eligible (15) drops all the way down to row 0 and feeds into Blocker(0,15) which feeds into Pick(0). In the illustrated embodiment the Pick(0) is output on the same side of the matrix 300 that Eligible(X) came in on, but in alternative embodiments the logic tree could be built in either direction depending on the location of the next stage of critical path logic.

Figure 5:
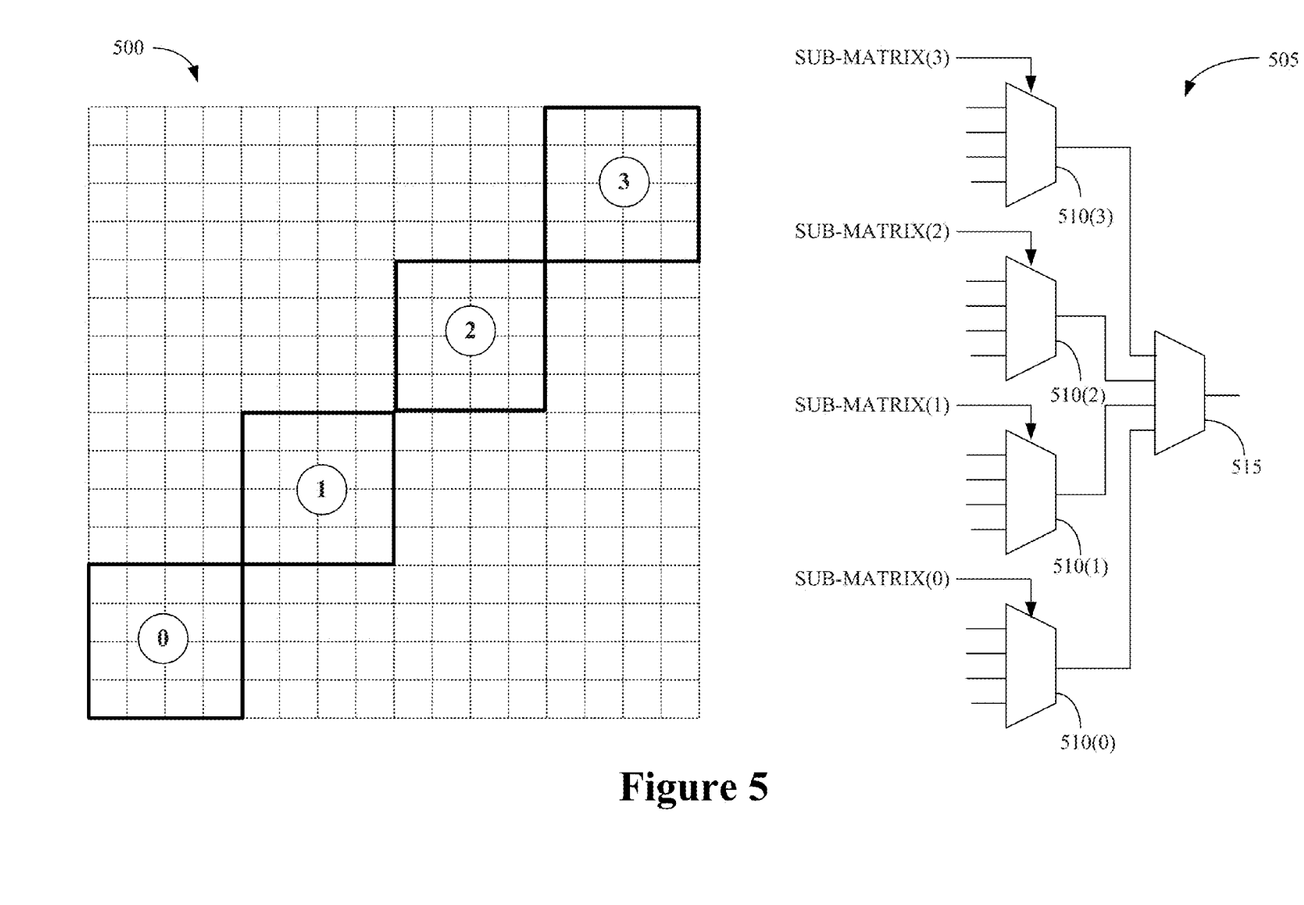
FIG. 5 conceptually illustrates a third exemplary embodiment of a matrix that is subdivided into sub matrices and used to provide input to a multiplexer tree.

FIG. 5 conceptually illustrates a third exemplary embodiment of a matrix 500 that is subdivided into sub-matrices and used to provide input to a multiplexer tree 505. In the illustrated embodiment, the sub-matrices are designed to lie upon the diagonal of the matrix 500. Each sub-matrix includes entries corresponding to mutually exclusive subsets of the instructions. For example, the full 16×16 matrix 500 shown in FIG. 5 includes four 4×4 sub-matrices. The sub-matrix indicated by the encircled 0 includes the 4×4 sub-matrix of rows 0-3 and columns 0-3, the sub-matrix indicated by the encircled 1 includes the 4×4 sub-matrix of rows 4-7 and columns 4-7, the sub-matrix indicated by the encircled 2 includes the 4×4 sub-matrix of rows 8-11 and columns 8-11, and the sub-matrix indicated by the encircled 3 includes the 4×4 sub-matrix of rows 12-15 and columns 12-15. However, persons of ordinary skill in the art having benefit of the present disclosure should appreciate that this particular matrix structure is intended to be illustrative and alternative embodiments may use different size matrices and/or different numbers of sub-matrices that may be distributed differently within the matrix.

The information in the matrix 500 is used to generate and provide input signals to the multiplexer tree 505. In the illustrated embodiment, the multiplexer tree 505 is constructed to select one input from among 16 that correspond to the 16 entries in the matrix 500. The multiplexer tree 505 includes a first set of multiplexers 510 that are each configured to select one of the entries from a corresponding sub matrix using an input signal that is generated using information in the corresponding sub-matrix. For example, the multiplexer 510(0) can be used to select the oldest ready instruction among the instructions assigned to entries 0-3 in the matrix 300, the multiplexer 510(1) can be used to select the oldest ready instruction among the instructions assigned to entries 4-7 in the matrix 300, the multiplexer 510(2) can be used to select the oldest ready instruction among the instructions assigned to entries 8-11 in the matrix 300, and the multiplexer 510(3) can be used to select the oldest ready instruction among the instructions assigned to entries 12-15 in the matrix 300. However, persons of ordinary skill in the art having benefit of the present disclosure should appreciate that the multiplexer tree 505 is intended to be illustrative and alternative embodiments may include different numbers of multiplexers and/or tree stages.

In the illustrated embodiment, the row/column 1-hot properties apply throughout the entire matrix and consequently apply within the sub-matrices. Thus, the oldest ready instruction for the matrix 500 can be selected by selecting the oldest ready instructions from within each subset of instructions corresponding to a sub-matrix and then selecting the oldest ready instruction from within the set of oldest ready instructions for each of the sub-matrices. Moreover, in some embodiments, the input signal provided to the multiplexer 510(0) can be had for free from the Pick(0) computation, as discussed herein. In the illustrated embodiment, the input signals for the multiplexes 510 are used to choose between four possible inputs from each sub-matrix. For example, for the 4×4 sub-matrix 0, the select signals for each multiplexer input can be defined as:

Select(0)=Eligible(0)&~Blocker(0,1)&~
Blocker(0,2)&~Blocker(0,3)

Select(1)=~Blocker(1,0)&Eligible(1)&~
Blocker(1,2)&~Blocker(1,3)

Select(2)=~Blocker(2,0)&~
Blocker(2,1)&Eligible(2)&~Blocker(2,3)

Select(3)=~Blocker(3,0)&~Blocker(3,1)&~
Blocker(3,2)&Eligible(3)

As discussed herein, Select(0), Select(1), Select(2), and Select(3) are (at most) 1-hot so can be sent directly into the multiplexer controls for the first level of multiplexer 510(0) selection because only one of the select signals has a value indicating an oldest ready instruction within the sub-matrix. Values of the select signals for the other multiplexers 510 can be similarly generated from the information in the corresponding sub-matrices.

An input signal to the second stage 515 of the multiplexer tree 505 can also be determined using the information in the matrix 500. In the illustrated embodiment, the multiplexer 515 can select between the oldest ready instructions associated with each sub-matrix (e.g., the outputs of the multiplexers 510) by comparing the information in the entries of the matrix 500 that correspond to other columns in the row associated with each instruction. A function Pick(X) can be used to indicate whether the instruction corresponding with the row X should be selected by the multiplexer tree 505. For one example, the function Pick(0) the 0-th row may be defined as:

Pick(0)=PickGroup(0)&PickGroup(1)&PickGroup(2)&
PickGroup(3)

Where the PickGroups for row-0 are defined as:

PickGroup(0)=Select(0) as defined previously

PickGroup(1)=~Blocker(0,4)&~Blocker(0,5)&~
Blocker(0,6)&~Blocker(0,7)

PickGroup(2)=~Blocker(0,8)&~Blocker(0,9)&~
Blocker(0,10)&~Blocker(0,11)

PickGroup(3)=~Blocker(0,12)&~Blocker(0,13)&~
Blocker(0,14)&~Blocker(0,15)

Similar Pick values and PickGroup values can be calculated for the other rows in the matrix 500. Defining the functions in this manner may allow the first level of multiplexer selection to be performed faster than the full pick computation. In the illustrated embodiment, the group select to the $2^{nd}$ level of the issue multiplexer 515 may require OR-ing of the Picks (e.g., to pick mux0-3, the multiplexer select logic may compute the value of OR(Pick(0),Pick(1),Pick(2),Pick(3)) to use as the input select signal for multiplexer 515. Since the Pick vector is (at most) 1-hot, this group ORing is also (at most) 1-hot. The full computation of Pick and ORing to $2^{nd}$ level issue multiplexer 515 can be implemented as a parallel path with the first level multiplexer path of control.

Figure 6:
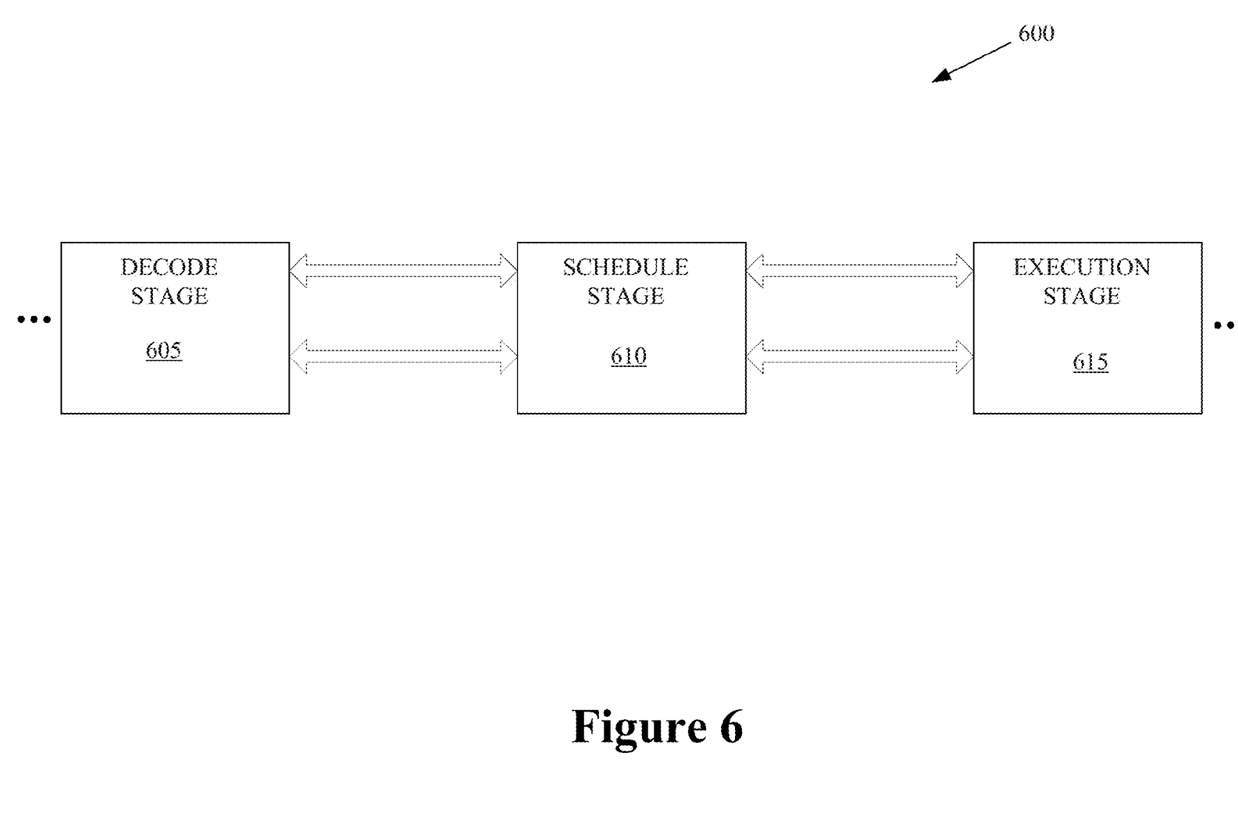
FIG. 6 conceptually illustrates one exemplary embodiment of an instruction pipeline that may be implemented in the semiconductor device depicted in FIG. 2.

FIG. 6 conceptually illustrates one exemplary embodiment of an instruction pipeline 600 that may be implemented in the semiconductor device 200 depicted in FIG. 2. In the illustrated embodiment, the instruction pipeline 600 includes a decoded stage 605, a scheduling stage 610, and an execution stage 615. However, persons of ordinary skill in the art having benefit of the present disclosure should appreciate that alternative embodiments may have more or fewer stages. The stages 605, 610, 615 in the illustrated embodiment are connected by two pipelines indicated by double-headed arrows. However, persons of ordinary skill in the art having benefit of the present disclosure should appreciate that alternative embodiments may use more or fewer pipelines.

Each pipeline includes a separate instruction picker and scheduler and uses a separate set of eligibility vectors and Pick vectors. In one embodiment, decoded instructions may be sent onto either pipeline. For example, the decoded instructions may be dynamically sent to the pipelines. If the pickers associated with both pipes happen to choose the same instruction, then one pipe can cancel the other. In some cases, such as those that implement a fully age-ordered logic matrix as discussed herein, cancellation may occur more often because the fully age ordered logic picks the oldest instruction, and if the oldest instruction can go to both pipelines then the pickers associated with both pipelines are both likely to choose one the same (oldest ready) instruction. Consequently, one of the pipes is frequently or always canceled. This may be a performance opportunity cost because the other picker could have picked a different instruction.

In one embodiment, a pipe balancing algorithm can be used to distribute instructions between the pipelines. For example, in systems that implement a two wide execution pipe, some instructions could go to either pipe. However, some embodiments of the matrix algorithm described herein may prefer that instructions be statically bound to a given pipe. In one embodiment, instructions that can go to either pipe may be bound to the pipe that currently has the least number of instructions. The number of instructions on each pipe can be monitored using counters associated with each pipe. The counters are incremented when an instruction is added to the pipeline and decremented when an instruction leaves the pipeline. One exemplary pipe balancing algorithm can be written in pseudo-code as follows:

```
// -  assign PIPE_ANY cases to the pipe with the smaller counter
// -  special case1: if counters are equal,
//    a) if slot1 is p0, then send PIPE_ANY on slot0 to PIPE1
//    b) else             send PIPE_ANY on slot0 to PIPE0
// -  special case2: if counters are equal,
//    a) if slot0 is p1, then send PIPE_ANY on slot1 to PIPE0
//    b) else             send PIPE_ANY on slot1 to PIPE1
```

Embodiments of processor systems that can implement the matrix algorithm for scheduling operations as described herein (such as the processor system 200) can be fabricated in semiconductor fabrication facilities according to various processor designs. In one embodiment, a processor design can be represented as code stored on a computer readable media. Exemplary codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method for implementation in a processor-based system, comprising:
    selecting a first subset of instructions, wherein each instruction in the first subset is the earliest in program order of instructions associated with a corresponding one of a plurality of sub-matrices of a matrix having a plurality of matrix entries, each matrix entry comprising a bit position indicating the program order of one pair of instructions that are eligible for execution; and
    selecting, from the first subset of instructions, the instruction that is earliest in program order based on the bit positions for each pair of instructions within the first subset of instructions.

2. The method of claim 1, wherein the instructions are floating-point operations, and wherein selecting the instruction that is earliest in program order comprises scheduling the floating-point operation that is earliest in program order for execution by a floating-point unit.

3. The method of claim 1, wherein selecting the first subset of instructions comprises generating a plurality of first signals based on the matrix entries in the matrix and providing the plurality of first signals to a corresponding plurality of first multiplexers that are each configured to select one of the first subset of instructions in response to one of the first signals.

4. The method of claim 3, wherein generating the plurality of first signals based on the matrix entries in the matrix comprises generating each of the plurality of first signals based upon matrix entries in one of the plurality of sub-matrices.

5. The method of claim 3, wherein selecting the instruction that is earliest in program order comprises generating a second signal based on the matrix entries in the matrix and providing the second signal to a second multiplexer that is configured to select the instruction that is earliest in program order from the first subset of instructions in response to the second signal.

6. The method of claim 1, comprising defining the plurality of the sub-matrices such that each sub-matrix indicates the relative program order of a different subset of the pairs of instructions that are eligible for execution.

7. The method of claim 1, comprising providing the selected instruction that is earliest in the program order for execution and modifying the matrix to remove the matrix entries associated with the instruction provided for execution.

8. The method of claim 7, comprising iteratively selecting another first subset based on the modified matrix, selecting the instruction that is latest in the program order from said another first subset, providing the selected instruction for execution, and modifying the matrix to remove the matrix entries associated with the selected instruction.

9. The method of claim 1, comprising modifying the matrix to add matrix entries indicating the relative program order of a new instruction and instructions that are already reflected in the matrix, said modification occurring in response to information indicating that the new instruction is eligible for execution.

10. The method of claim 9, comprising associating the new instruction with one of a plurality of instruction pipelines prior to modifying the matrix to add the matrix entries indicating the relative program order of the new instruction and the instructions that are already reflected in the matrix.

11. An apparatus, comprising:
    means for selecting a first subset of instructions, wherein each instruction in the first subset is the earliest in program order of instructions associated with a corresponding one of a plurality of sub-matrices of a matrix having a plurality of matrix entries, each matrix entry comprising a bit position indicating the program order of one pair of instructions that are eligible for execution; and
    means for selecting, from the first subset of instructions, the instruction that is earliest in program order based on the bit positions for each pair of instructions within the first subset of instructions.

12. An apparatus, comprising:
    a processor core comprising pick logic configured to:
        select a first subset of instructions, wherein each instruction in the first subset is the earliest in program order of instructions associated with a corresponding one of a plurality of sub-matrices of a matrix having a plurality of matrix entries, each matrix entry comprising a bit position indicating the program order of a pair of instructions that are eligible for execution; and
        select, from the first subset of instructions, the instruction that is earliest in program order based on the bit positions for each pair of instructions within the first subset of instructions.

13. The apparatus of claim 12, comprising a memory element for storing the matrix.

14. The apparatus of claim 12, wherein the instructions are floating-point operations, and wherein the pick logic is configured to schedule the floating-point operation that is earliest in program order for execution by a floating-point unit.

15. The apparatus of claim 12, comprising a plurality of first multiplexers that are communicatively coupled to the pick logic, and wherein the pick logic is configured to generate a plurality of first signals based on the matrix entries in the matrix and provide the plurality of first signals to the plurality of first multiplexers that are each configured to select one of the first subset of instructions in response to one of the first signals.

16. The apparatus of claim 15, wherein the pick logic is configured to generate each of the plurality of first signals based upon matrix entries in one of the plurality of sub-matrices.

17. The apparatus of claim 15, comprising a second multiplexer that is communicatively coupled to the pick logic and the plurality of first multiplexers, wherein the pick logic is configured to generate a second signal based on the matrix entries in the matrix and provide the second signal to the second multiplexer that is configured to select the instruction that is earliest in program order from the first subset of instructions in response to the second signal.

18. The apparatus of claim 12, wherein the pick logic is configured to define the plurality of the sub-matrices such that each sub-matrix indicates the relative program order of a different subset of the pairs of instructions that are eligible for execution.

19. The apparatus of claim 12, comprising a buffer for storing instructions and execution logic that is communicatively coupled to the buffer, and wherein the pick logic is configured to cause the selected instruction that is earliest in the program order to be provided to the execution logic for execution.

20. The apparatus of claim 19, wherein the pick logic is configured to modify the matrix to remove the matrix entries associated with the selected instruction that is earliest in the program order.

21. The apparatus of claim 20, wherein the pick logic is configured to iteratively select the first subset based on the modified matrix, select the instruction that is latest in the program order from the first subset, cause the selected instruction to be provided to the execution logic for execution, and modify the matrix to remove the matrix entries associated with the selected instruction.

22. The apparatus of claim 12, wherein the pick logic is configured to modify the matrix to add matrix entries indicating the relative program order of a new instruction and instructions that are already reflected in the matrix, said modification occurring in response to information indicating that the new instruction is eligible for execution.

23. The apparatus of claim 22, wherein the pick logic is configured to associate the new instruction with one of a plurality of instruction pipelines prior to modifying the matrix to add the matrix entries indicating the relative program order of the new instruction and the instructions that are already reflected in the matrix.

24. A non-transitory computer readable media including instructions that when executed can configure a manufacturing process used to manufacture a semiconductor device comprising:
    pick logic configured to:
        select a first subset of instructions, wherein each instruction in the first subset is the earliest in program order of instructions associated with a corresponding one of a plurality of sub-matrices of a matrix having a plurality of matrix entries, each matrix entry comprising a bit position indicating the program order of one pair of instructions that are eligible for execution; and
        select, from the first subset of instructions, the instruction that is earliest in program order based on the bit positions for each pair of instructions within the first subset of instructions.

25. The non-transitory computer readable media set forth in claim 24, wherein the computer readable media is configured to store at least one of hardware description language instructions or an intermediate representation of the pick logic.

26. The non-transitory computer readable media set forth in claim 25, wherein the instructions when executed configure generation of lithography masks used to manufacture the pick logic.

* * * * *